(12) United States Patent
Laot et al.

(10) Patent No.: US 7,277,514 B2
(45) Date of Patent: Oct. 2, 2007

(54) INTER-SYMBOL INTERFERENCE CANCELLER

(75) Inventors: Christophe Laot, Plougonvelin (FR); Charlotte Langlais, Locmaria Plouzane (FR); Maryline Helard, Rennes (FR)

(73) Assignee: France Telecom, Paris (FR)

( * ) Notice: Subject to any disclaimer, the term of this patent is extended or adjusted under 35 U.S.C. 154(b) by 482 days.

(21) Appl. No.: 10/493,463

(22) PCT Filed: Oct. 23, 2002

(86) PCT No.: PCT/FR02/03624

§ 371 (c)(1),
(2), (4) Date: Sep. 15, 2004

(87) PCT Pub. No.: WO03/036893

PCT Pub. Date: May 1, 2003

(65) Prior Publication Data

US 2005/0031063 A1     Feb. 10, 2005

(30) Foreign Application Priority Data

Oct. 26, 2001 (FR) .................................. 01 13991

(51) Int. Cl.
*H04L 1/00* (2006.01)
(52) U.S. Cl. ...................... 375/348; 375/229; 375/350; 375/233; 375/232; 455/307
(58) Field of Classification Search ................ 375/348, 375/346, 350, 220, 229, 347, 144, 148; 455/296
See application file for complete search history.

(56) References Cited

U.S. PATENT DOCUMENTS 5,774,505 A * 6/1998 Baugh ........................ 375/348

(Continued)

FOREIGN PATENT DOCUMENTS

EP    0 833 484 A1    4/1998
WO    WO93/22854 A1   11/1993

OTHER PUBLICATIONS

Gersho et al., "Adaptive Cancellation Of Channel Nonlinearities For Data Transmission," Links for the Future, Amsterdam, International Conference on Communications, Amsterdam, North-Holland, NL, vol. 3, pp. 1239-1242, May 14-17, 1984.

(Continued)

*Primary Examiner*—Mohammed Ghayour
*Assistant Examiner*—Sonia J King
(74) *Attorney, Agent, or Firm*—Patterson, Thuente, Skaar & Christensen, P.A.

(57) ABSTRACT

The invention relates to a device for cancelling inter-symbol interference in a sampled digital signal. The device comprises a first filter, for which the optimum transfer function is identical to that of the transmission channel, and which receives a sequence of samples ($\{\hat{d}_n\}_{n \in N}$) representative of the digital signal sent to the input of the transmission channel, a subtractor circuit to subtract the first filter output ($\{\hat{d}'_n\}_{n \in N}$) from the sequence of input samples ($\{r_n\}_{n \in N}$), a second filter tuned to the transmission channel, with an optimum transfer function H*(f), to which the output ($\{e_n\}_{n \in N}$) from the subtractor circuit is input, and an adder circuit designed to add the output from the second filter to the sequence of samples ($\{\hat{d}_n\}_{n \in N}$) representative of the digital signal sent to the input of the transmission channel, and thus generating a sequence of complex symbols ($\{\tilde{d}_n\}_{n \in N}$) without any inter-symbol interference.

20 Claims, 6 Drawing Sheets

U.S. PATENT DOCUMENTS 5,787,131 A * 7/1998 Bottomley .................. 375/347
6,307,901 B1 * 10/2001 Yu et al. ..................... 375/341
6,363,104 B1 * 3/2002 Bottomley .................. 375/148
6,717,985 B1 * 4/2004 Poon .......................... 375/229

OTHER PUBLICATIONS

Reed et al., "A Frequency Domain Time-Dependent Adaptive Filter For Interference Rejection,", IEEE, pp. 0391-0397, 1988.

* cited by examiner

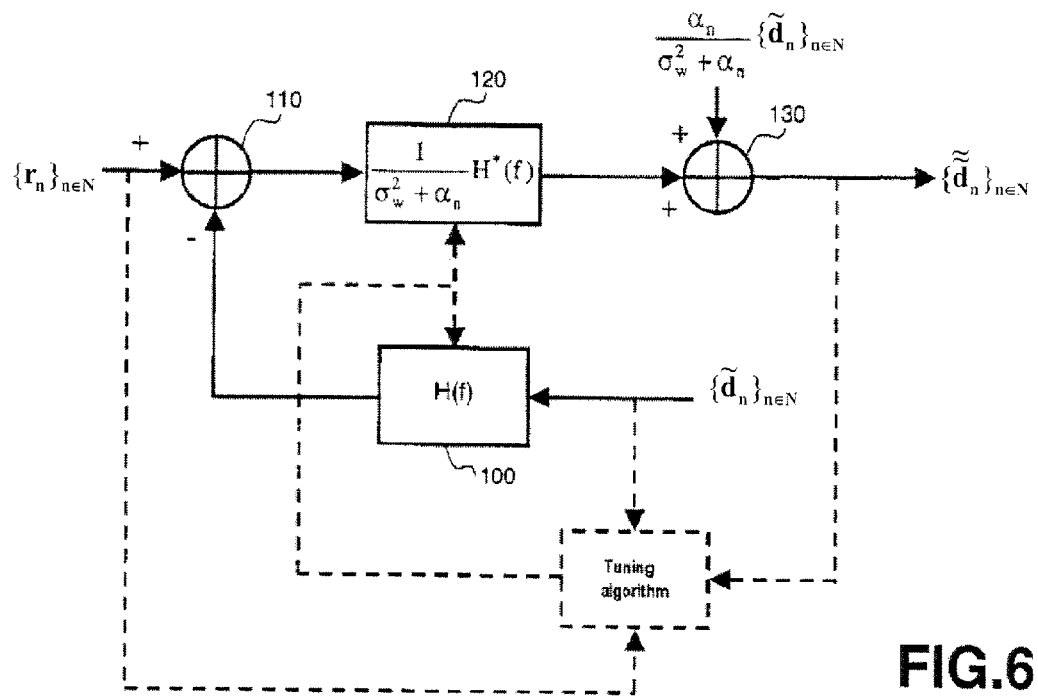
FIG.6
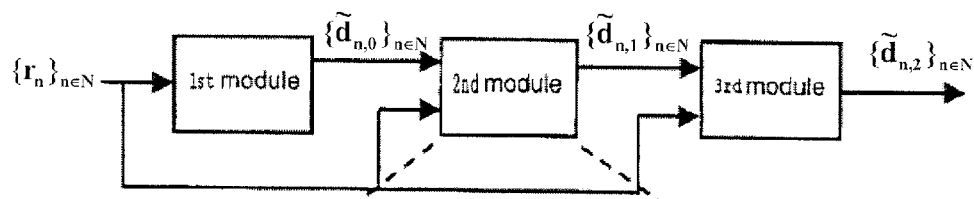
FIG.7
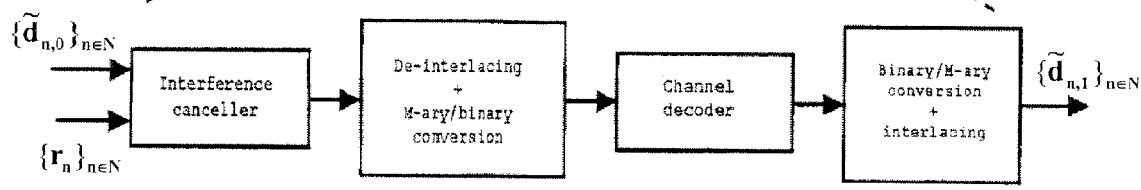

INTER-SYMBOL INTERFERENCE CANCELLER

RELATED APPLICATION

This application claims priority to PCT Application No. PCT/FR02/03624 filed Oct. 23, 2002 and French Application No. 0113991 filed Oct. 26, 2001.

TECHNICAL FIELD

This invention relates to a device for cancelling inter-symbol interference in a sampled digital signal. The invention is applicable particularly to the field of digital transmissions, and is designed particularly for use in a digital signals receiver in order to cancel inter-symbol interference resulting from the presence of multiple paths in the digital data transmission channel.

BACKGROUND ART

FIG. 1 illustrates a system for transmission of complex symbols $\{d_n\}_{n \in N}$ emitted by a symbols source. This transmission system comprises a modulator, a send filter, a transmission medium, a reception filter, a demodulator, an adder introducing Gaussian white noise samples $\{W_n\}_{n \in N}$ and a sampler with a sampling period T. The modulator, send filter, transmission medium, reception filter and demodulator assembly forms a discrete equivalent transmission channel generating inter-symbol interferences (ISI). The transmission system outputs a sequence of complex symbols $\{r_n\}_{n \in N}$ defined by the following relation:

$$r_n = \sum_{k=L_1+1}^{L_2} \Gamma_k(n) d_{n-k} + w_n \quad (1)$$

where $(\Gamma_{-L_1+1}(n), \ldots, \Gamma_0(n), \ldots, \Gamma_{L_2}(n))$ are coefficients (possibly complex) of the equivalent discrete transmission channel at time n, and $L_2$ and $L_1-1$ are respectively the past and future number of complex symbols generating the interference on the current complex symbol.

The equivalent discrete transmission channel transfer function that inputs inter-symbol interference is as follows, at time n:

$$H_n(f) = \sum_{k=L_1+1}^{L_2} \Gamma_k(n) \exp(-j2\pi f kT) \quad (2)$$

where T is the time period between two consecutive complex symbols in the sequence of complex symbols $\{r_n\}_{n \in N}$.

For simplification reasons, the transfer function $H_n(f)$ is denoted H(f) in the remainder of the description.

In equations (1) and (2), it is assumed that the pulse response of the equivalent discrete transmission channel (corresponding to the inverse Fourier transform of the transfer function) is defined by $L=L_1+L_2$ coefficients.

One of the best known inter-symbol interference cancellers is described in the document entitled "Adaptive Cancellation of Inter-symbol Interference for Data Transmission" by A. Gersho and T. L. Lim, Bell Systems technical journal, Vol. 11, No. 60, pp. 1997-2021, November, 1981.

A diagram of the structure of this inter-symbol interference canceller is shown in FIG. 2 of this application.

This interference canceller comprises a first filter 10 called the front filter, to process the sequence of complex symbols $\{r_n\}_{n \in N}$, a second filter 20 called the back filter to process a sequence of complex symbols $\{\tilde{d}_n\}_{n \in N}$, and a subtractor circuit 30 to subtract the output from filter 20 from the output from filter 10. The subtractor circuit 30 outputs a sequence of complex symbols $\{\hat{d}_n\}_{n \in N}$ from which the inter-symbol interferences generated by the transmission channel have been eliminated.

The sequence $\{\tilde{d}_n\}_{n \in N}$ represents either complex symbols sent through the transmission channel by the sending source if the system uses a learning sequence, or complex symbols that are an estimate of complex symbols emitted by the sending source. In the second case, the sequence of symbols $\{\tilde{d}_n\}_{n \in N}$ is provided by another device in the receiver, for example a transverse linear equaliser or a maximum probability equaliser.

For generalisation reasons, it is assumed that the transmission channel varies in time. Therefore, the coefficients of the pulse response are not standardised. We then obtain the following relation:

$$\sum_{k=L_1+1}^{L_2} |\Gamma_k(n)|^2 = \alpha_n.$$

It is also assumed that the signal sent has a unit power, and therefore that the variance $\sigma_d^2$ of symbols sent is equal to 1. With this assumption, $\alpha_n$ is equal to the estimated power of the transmission channel.

The filter 10 of the device converges towards a filter tuned to the transmission channel. The optimum coefficients, for example in the sense of the minimum mean quadratic error criterion, of filter 10 are therefore the coefficients of the filter tuned to the transmission channel. Therefore, the optimum transmission function of this filter is equal to $$\frac{1}{\sigma_w^2 + \alpha_n} H*(f).$$

H*(f) denotes the conjugate of the transfer function H(f) and $\sigma_w^2$ denotes the variance of the Gaussian noise.

The filter 20 is designed to reconstruct inter-symbol interferences present at the output from filter 10. Therefore the filter 20 converges to a filter with transfer function equal to $$\frac{1}{\sigma_w^2 + \alpha_n}(|H(f)|^2 - \alpha_n).$$

Therefore the filters 10 and 20 represent sizes L and 2L−1 respectively. The filter coefficients are output as the processing is being done, either using a channel estimate algorithm or using a matching algorithm designed to minimise a given optimisation criterion.

The invention is based on a search for inter-symbol interference cancellers designed to reduce the size of filters necessary for their use, so that degradation caused by an excessive number of coefficients can be limited and to reduce the coefficient convergence time.

SUMMARY OF THE INVENTION

The invention relates to a device for cancelling inter-symbol interference in a sequence of digital signal input samples originating from a transmission channel defined by its transfer function H(f) in the frequency domain, each sample being representative of a complex symbol, characterised in that it comprises:

a first filter that converges towards a filter with a transfer function H(f), the said first filter receives a sequence of samples as input representing the digital signal sent to the input of the said transmission channel, a subtractor circuit to subtract the output of the said first filter from the said sequence of input samples, a second filter that converges towards a filter tuned to the transmission channel, the output from the said subtractor circuit being input to this second filter, and an output circuit designed to combine the output from the said second filter and the sequence of samples representative of the digital signal sent to the input of the said transmission channel to generate a sequence of complex symbols without the inter-symbol interferences generated by the transmission channel.

For example, the output circuit may be an adder circuit designed to add the output from the said second filter to the said sequence of samples representative of the digital signal sent to the input of the said transmission channel.

Preferably, an amplitude correction coefficient is applied to the samples of the sequence representative of the digital signal sent to the input of the transmission channel that are processed by the adder circuit.

The main advantage of this interference canceller is that it comprises two filters using a reduced number of coefficients.

According to one characteristic of the invention, in the case of a transmission channel disturbed by an additive noise with coefficients that vary with time, the amplitude correction coefficient depends on the estimated power of the transmission channel and the variance of the additive noise.

The invention also relates to a digital signal receiver characterised in that it comprises a device for cancellation of inter-symbol interference as described above, and a dedicated circuit to generate the said sequence of samples representative of the digital signal sent to the input of the said transmission channel. For example, the dedicated circuit is a transverse linear equaliser or a maximum probability equaliser into which the sequence of input samples is input.

The invention also relates to a turbo-equalisation device comprising a plurality of turbo-equalisation modules in series, characterised in that each turbo-equalisation module with a rank greater than 1 in the said series of modules comprises a device for cancelling inter-symbol interference as described above, and in that the sequence of samples representative of the digital signal sent to the input of the transmission channel is output by the lower rank turbo-equalisation module, for each interference cancelling device.

The invention also relates to a device for cancelling inter-symbol interference in J sequences of input samples of a digital signal originating from J transmission channels defined by their transfer functions $H^{(j)}(f)$ in the frequency domain, where J is an integer greater than or equal to 2, each sample being representative of a complex symbol, characterised in that it comprises:

a first set of J filters, each of which converges towards a filter with transfer function $H^{(j)}(f)$, j∈[1, . . . , J], each of the filters of the said first set receiving a sequence of samples as input representative of the digital signal sent to the input of the said transmission channels, a set of J subtractor circuits to subtract the outputs from the said J filters in the said first set from the corresponding said J sequences of input samples, a second set of J filters that converge towards filters tuned to the said J transmission channels, each filter in the said second set receiving the output from one of the said J subtractor circuits as input, and a first adder circuit to add the samples output by the J filters in the said second set, an output circuit designed to combine the output from the said first adder circuit and the sequence of samples representative of the digital signal sent to the input of the said transmission channels, to generate a sequence of complex symbols from which the inter-symbol interference generated by the said transmission channels has been eliminated. This device is used in the case of multiple receptions or so-called fractioned reception of the sent symbols.

As before, the filter coefficients of the said first and second set of filters are determined by a digital processing circuit using a tuning algorithm based on an optimisation criterion designed to minimise the influence of inter-symbol interference at the output from the said device or by a transmission channel estimating circuit.

Finally, the invention also relates to a turbo-equalisation device comprising a plurality of turbo-equalisation modules in series characterised in that each turbo-equalisation module with a rank of more than 1 in the said series of modules comprises a device for cancelling inter-symbol interference like that described above for a multiple or fractioned reception of symbols and in that, for each interference cancelling device, the said sequence of samples representative of the digital signal sent to the input of the transmission channel is output by the lower rank turbo-equalisation module.

Other characteristics and advantages of the invention will become clear after reading the following detailed description given with reference to the attached drawings among which:

BRIEF DESCRIPTION OF THE DRAWINGS

FIG. 6 shows an inter-symbol interference canceller that conforms to the invention comprising a digital processing circuit using a tuning algorithm to determine the coefficients of the two filters of the canceller;

FIG. 7 shows an application of the interference canceller according to the invention in a turbo-equalisation device;

DETAILED DESCRIPTION

Figure 2:
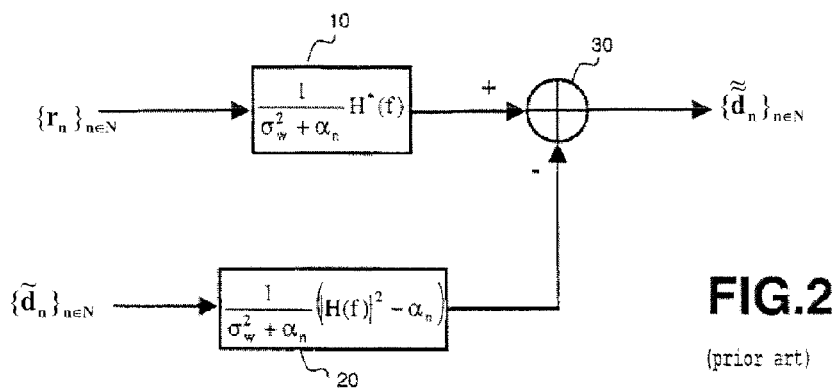
FIG. 2, already described, shows the diagram of an inter-symbol interference canceller according to prior art.

As indicated above, the conventional structure of the inter-symbol interference canceller shown in FIG. 2 requires the use of a first filter with L coefficients and a second filter with 2L–1 coefficients. The invention is designed to determine a canceller structure requiring a smaller number of coefficients.

Figure 3:
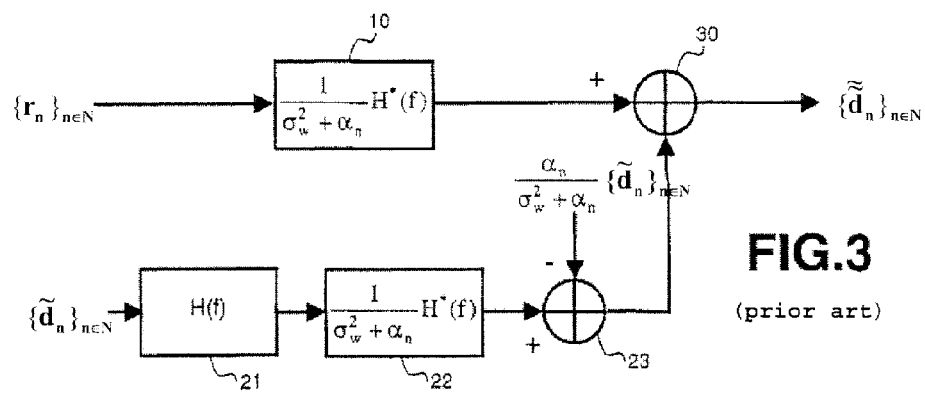
FIG. 3 shows a diagram equivalent to the canceller structure in FIG. 2.

As shown in FIG. 3, the filter 20 may be broken down into two filters 21 and 22 installed in cascade, and a subtractor circuit 23. The filter 21 converges towards a filter with transfer function H(f) and the filter 22 towards a filter with transfer function $$\frac{1}{\sigma_w^2 + \alpha_n} H*(f).$$

Since these two filters are linear, they may be inverted. The subtractor circuit 23 subtracts the sequence of complex samples $\{\tilde{d}_n\}_{n \in N}$ multiplied by the amplitude correction coefficient $$\frac{\alpha_n}{\sigma_w^2 + \alpha_n},$$

from the sequence of complex samples output from the cascade of filters 21 and 22. The filter tuned to the transmission channel with the transfer function $$\frac{1}{\sigma_w^2 + \alpha_n} H*(f)$$

is present in both branches of the canceller, in other words the branch processing complex samples $\{r_n\}_{n \in N}$ and the branch processing complex samples $\{\tilde{d}_n\}_{n \in N}$.

Figure 4:
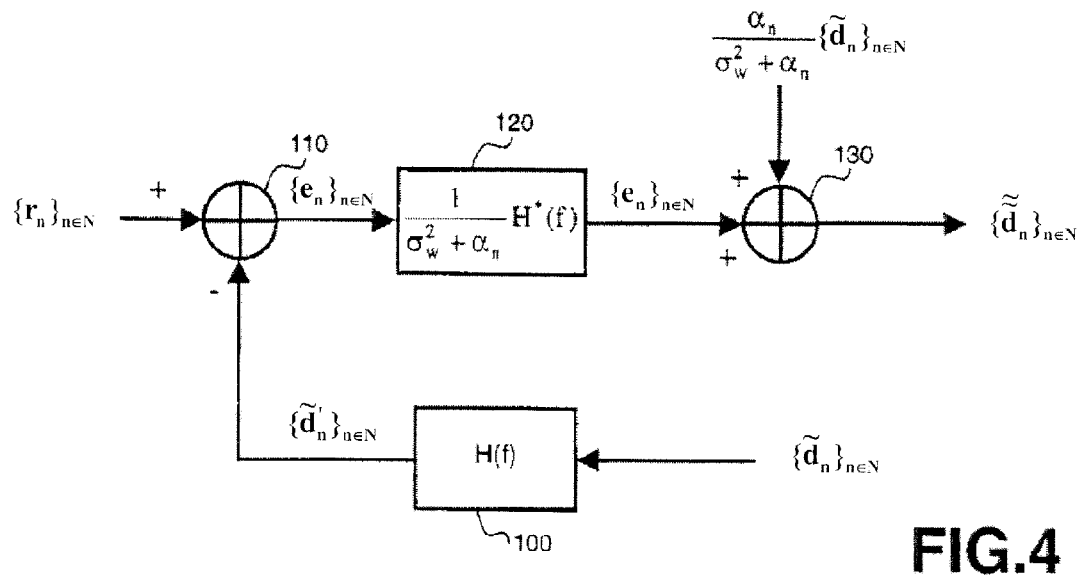
FIG. 4 shows the diagram of an inter-symbol interference canceller according to the invention.

According to the invention, this redundancy of the filter tuned to the transmission channel is eliminated to reduce the number of coefficients necessary for use of the canceller. FIG. 4 shows a structure of the interference canceller according to the invention.

The inter-symbol interference canceller according to the invention comprises a first filter 100 that converges towards a filter with transfer function H(f). The sequence of complex symbols $\{\tilde{d}_n\}_{n \in N}$ is input to this filter 100 and this filter outputs a sequence of complex symbols $\{\tilde{d}'_n\}_{n \in N}$. For example, the sequence of complex symbols $\{\tilde{d}_n\}_{n \in N}$ produced by a transverse linear equaliser or a maximum probability equaliser provided in the receiver. A subtractor circuit 110 is designed to subtract the sequence of complex symbols $\{\tilde{d}'_n\}_{n \in N}$ from the sequence of complex symbols $\{r_n\}_{n \in N}$ and to output a sequence of complex symbols $\{e_n\}_{n \in N}$. This output sequence is then filtered by a second filter 120. The filter 120 is a filter that converges towards a filter with transfer function $$\frac{1}{\sigma_w^2 + \alpha_n} H*(f).$$

The sequence of complex symbols output by this filter, and denoted $\{e_n\}_{n \in N}$ is added to the sequence of complex symbols $\{\tilde{d}_n\}_{n \in N}$ multiplied by the amplitude correction coefficient $$\frac{\alpha_n}{\sigma_w^2 + \alpha_n}$$

using an adder circuit 130 that outputs the sequence of complex symbols $\{\hat{d}_n\}_{n \in N}$.

The structure of this canceller is equivalent in terms of filtering to that shown in FIG. 2. However, it significantly reduces the size of canceller filters. According to the invention, the interference canceller comprises two filters 100 and 120 with L coefficients, instead of one filter with L coefficients and one filter with 2L–1 coefficients.

Figure 5:
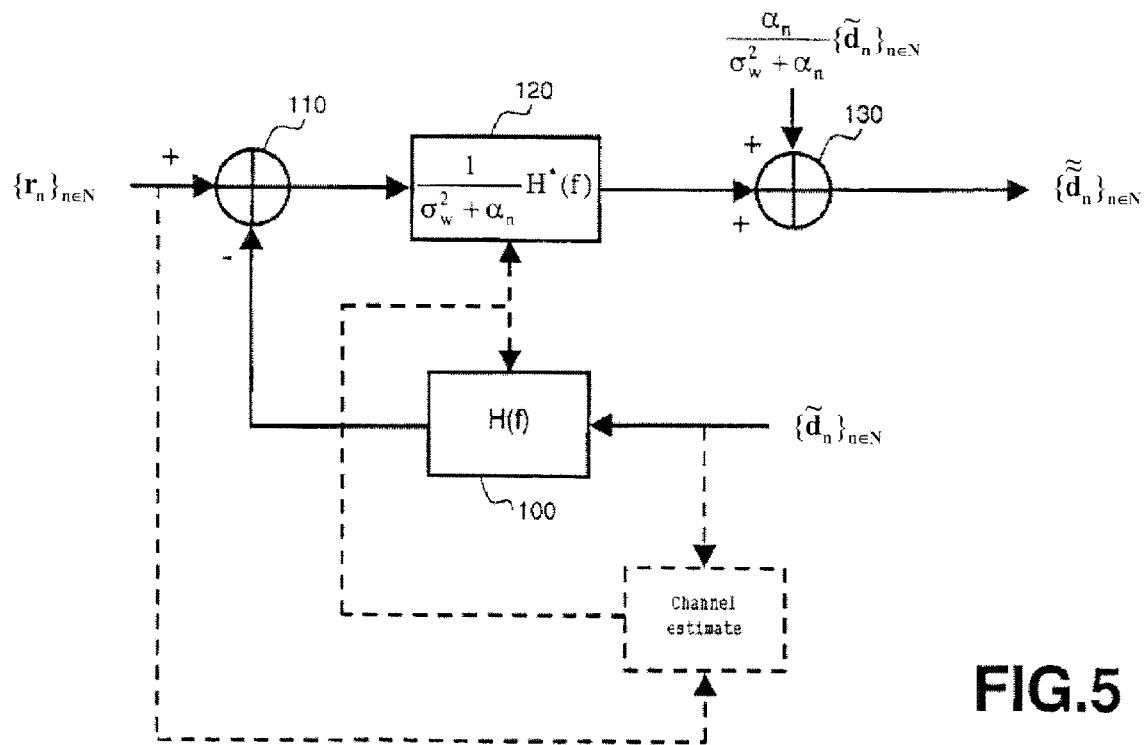
FIG. 5 shows an inter-symbol interference canceller according to the invention comprising a channel estimating circuit to determine the coefficients of the two filters in the canceller.

The filter coefficients may be determined either using a transmission channel estimating circuit as shown in dashed lines in FIG. 5, or by a digital processing circuit using a tuning algorithm minimising a given optimisation criterion as shown in dashed lines in FIG. 6.

With reference to FIG. 5, the coefficients of filters 100 and 120 are determined from a channel estimating circuit. More precisely, the channel estimate is used to calculate the coefficients of filter 100 and to deduce therefrom the coefficients of filter 120. The channel estimate consists in calculating the coefficients of the pulse response of the transmission channel. For example, these coefficients are determined by a RLS (Recursive Least Square) or LMS (Least Mean Square) type estimating method. The channel estimate is particularly useful for monitoring variations of the transmission channel when it varies with time. However, this solution is less than optimum when the transmission channel does not vary or only varies slightly with time since it does not directly minimise inter-symbol interference at the output from the canceller.

In the case shown in FIG. 6, the coefficients of the canceller filters are determined adaptively using a tuning algorithm that calculates the filter coefficients directly based on a given optimisation criterion designed to minimise inter-symbol interference at the output from the canceller. Since this criterion is directly related to minimisation of inter-symbol interference at the output from the canceller, it is optimum for correction of inter-symbol interference when the transmission channel is invariable with time.

The device according to the invention is particularly suitable for eliminating interference generated by a radio channel during the transmission of digital data.

It may be used in a turbo-equalisation device. The principle of turbo-equalisation is described in patent application Ser. No. 9/7 05,978 filed by the same applicant. A principle diagram of a turbo-equalisation device is shown in FIG. 7. This device comprises several equalisation and decoding modules each of which is identical and installed in series. Each module receives the sequence of samples $\{r_n\}_{n \in N}$ output from the transmission channel and delayed by a quantity equal to the processing time of the previous modules, and for modules with a rank greater than 1, the output from the previous module. Each module with a rank greater than 1 comprises an inter-symbol interference canceller that conforms to the invention, a de-interlacer, an M-ary/binary converter, a channel decoder, a binary/M-ary converter and a de-interlacer. In this application, the sequence of samples $\{\tilde{d}_n\}_{n \in N}$ necessary for operation of the interference canceller for a given module is output by the previous module. In FIG. 7, $\tilde{d}_{n,p}$ nap denotes the sequence of samples output by the turbo-equalisation module with rank p.

Figure 8:
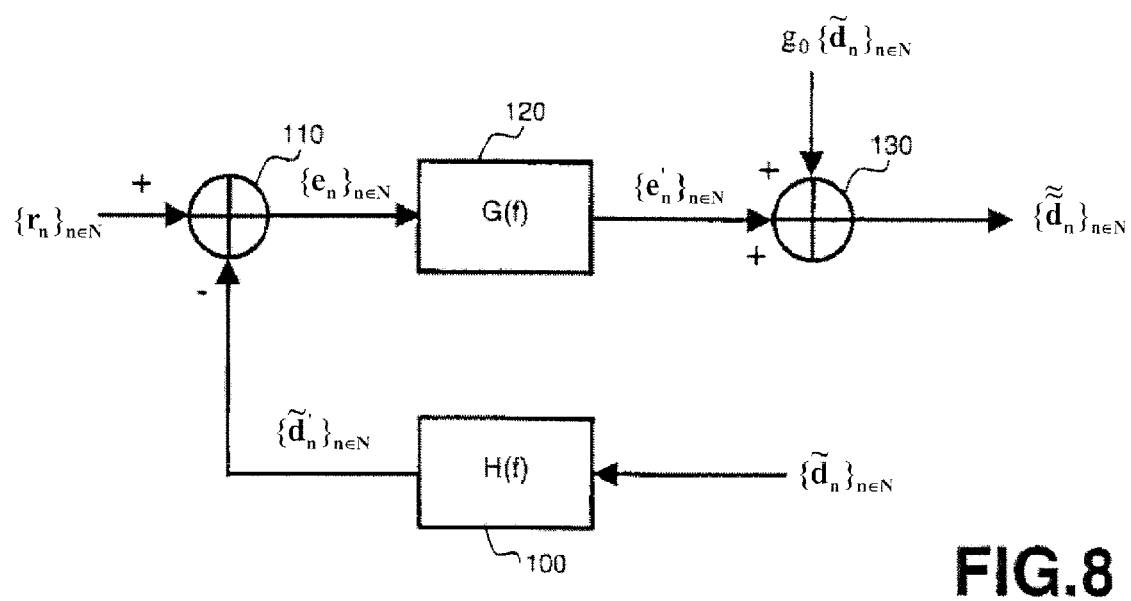
FIG. 8 shows an improved embodiment of the interference canceller in the context of a turbo-equalisation with channel estimating.

Within the context of turbo-equalisation, the structure of the interference canceller may be improved when the filter coefficients are determined by channel estimating. In this improved structure, the value of the transfer function of filter 120 and the value of the amplitude correction coefficient are modified. This improved structure is shown in FIG. 8 in which G(f) denotes the new transfer function of filter 120 and $g_0/\beta$ denotes the amplitude correction coefficient. The expressions for G(f), $g_0$ and $\beta$ are as follows:

$$G(f) = \frac{g_0}{\beta} \times \frac{H^*(f)}{|H(f)|^2 \cdot (\sigma_d^2 - E\{|\tilde{d}_n|^2\}) + \sigma_w^2}$$

$$\text{where } g_0 = \frac{\beta \cdot \sigma_d^2}{1 + \beta \cdot E\{|\tilde{d}_n|^2\}}$$

$$\text{and } \beta = T \cdot \int_{-1/2T}^{1/2T} \frac{|H(f)|^2}{|H(f)|^2 \cdot (\sigma_d^2 - E\{|\tilde{d}_n|^2\}) + \sigma_w^2} df$$

In turbo-equalisation the variance $E\{|\tilde{d}_n|^2\}$ varies with each iteration. Thus, the transfer function G(f) and the amplitude correction coefficient $g_0$ vary with each iteration until they tend towards the expressions shown in FIGS. 4 to 6.

With this structure, the interference canceller in the first modules of the turbo-equalisation device also acts as an equaliser.

The canceller structure described above dealt with a single sequence of samples $\{r_n\}_{n \in N}$ corresponding to the SISO (Single Input Single Output) case, the signal received by the canceller being sampled at the symbol time. In the past, the interference canceller only included one reception antenna.

This case may be generalised to the SIMO (Single Input Multiple Outputs) case, the signals being received by several reception antennas.

Figure 1:
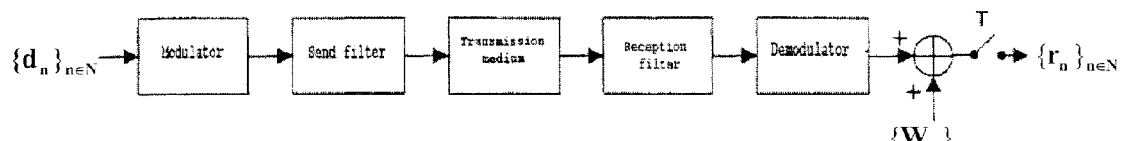
FIG. 1, already described, diagrammatically illustrates a discrete transmission channel.
Figure 9:
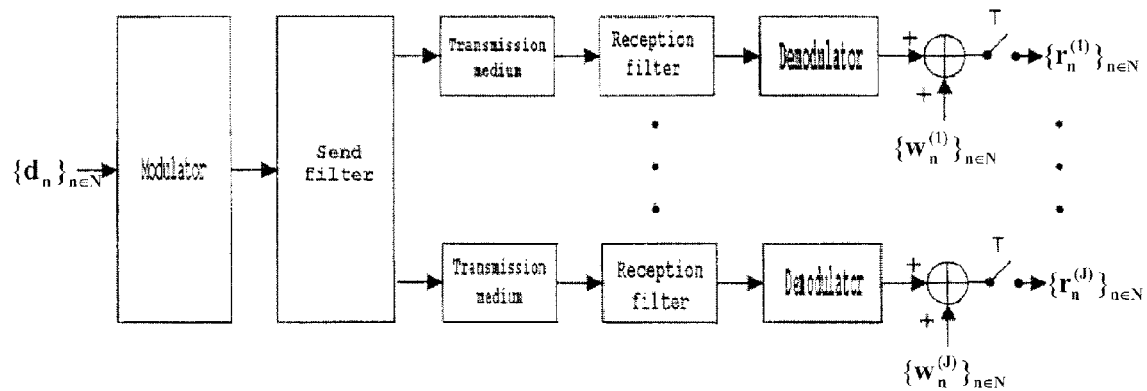
FIG. 9 diagrammatically illustrates the transmission channels in the case of multiple receptions at the interference canceller according to the invention.

FIG. 9 illustrates the complex symbol transmission channel $\{d_n\}_{n \in N}$ for this case. This figure should be compared with FIG. 1. The canceller receives a plurality of sequences of samples $r_n^{(j)}$, j ∈ [1, ..., J], that had transited through different transmission channels with transfer function $H_n^{(j)}$(f). As above, for simplification reasons, the transfer function $H_n^{(j)}$(f) is denoted $H^{(j)}$(f) in the remainder of the description.

The transmission system as shown in FIG. 9 outputs sequences of complex symbols $\{r_n^{(j)}\}_{n \in N}$, where j ∈ [1, ..., j] defined by the following relation:

$$r_n^{(j)} = \sum_{l=L_1^{(j)}}^{L_2^{(j)}} \Gamma_l^{(j)}(n) d_{n-l} + w_n^{(j)}$$

where ($\Gamma_l^{(j)}$(n)) are possibly complex coefficients of the transfer function $H^{(j)}$(f) of one of the transmission channels at time n, and $L^{(j)}$ represent the number of past and future complex symbols causing interference on the current complex symbol.

Figure 10:
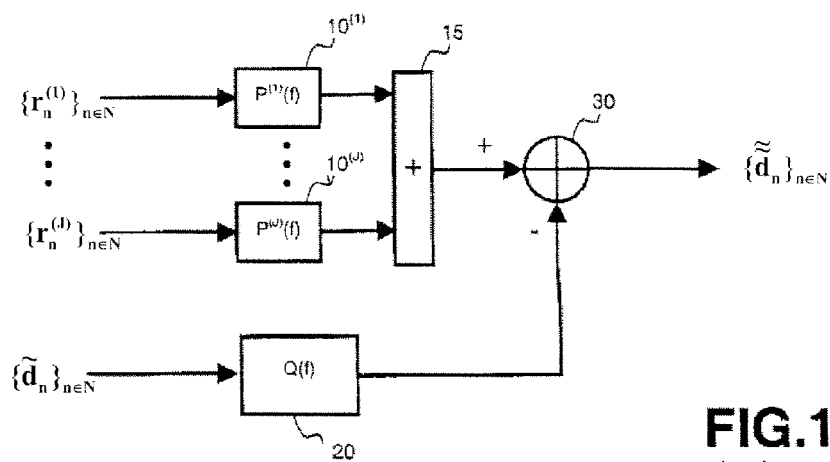
FIG. 10 shows the diagram of an interference canceller according to the prior art used in the case of multiple receptions.

FIG. 10 is a generalisation of FIG. 2 for the SIMO case. In this figure, the filter 10 is replaced by J filters $10^{(j)}$ with transfer function $P^{(j)}$(f), j ∈ [1, ..., J], each processing the sequence of samples $r_n^{(j)}$ and an adder circuit 15 to add the symbols output by the filters $10^{(j)}$. Q(f) denotes the transfer function of the filter 20. The mathematical expressions of the transfer functions $P^{(j)}$(f) and $Q^{(f)}$ are as follows:

$$P^{(j)}(f) = \frac{\sigma_d^2}{1 + \beta \cdot E\{|\tilde{d}_n|^2\}} \frac{\frac{H^{(j)*}(f)}{\sigma_j^2}}{1 + (\sigma_d^2 - E\{|\tilde{d}_n|^2\}) \cdot \sum_{i=1}^{J} |H^{(i)}(f)|^2/\sigma_i^2}$$

$$G(f) = \sum_{j=1}^{J} P^{(j)}(f) \cdot H^{(j)}(f) - T \int_{BN} \sum_{j=1}^{J} P^{(j)}(f) \cdot H^{(j)}(f) df$$

$$\text{where } g_0 = \frac{\beta \cdot \sigma_d^2}{1 + \beta \cdot E\{|\tilde{d}_n|^2\}}$$

$$\text{and } \beta = T \cdot \int_{BN} \frac{\sum_{i=1}^{J} |H^{(i)}(f)|^2/\sigma_i^2}{1 + (\sigma_d^2 - E\{|\tilde{d}_n|^2\}) \cdot \sum_{i=1}^{J} |H^{(i)}(f)|^2/\sigma_i^2} df$$

Figure 11:
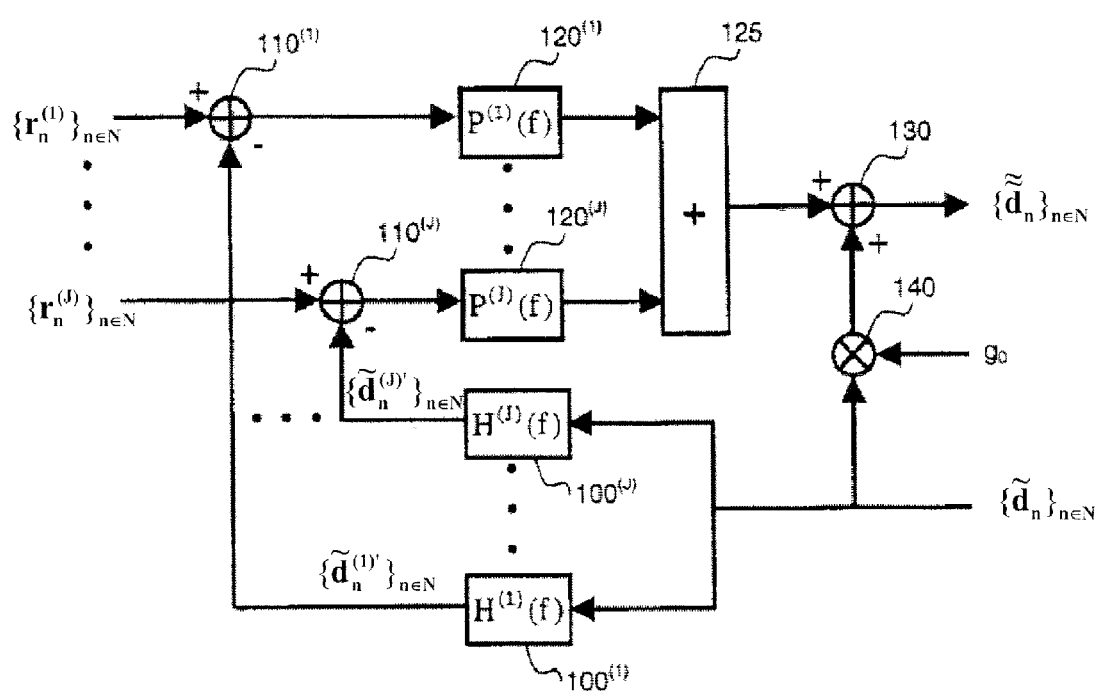
FIG. 11 shows the diagram of an interference canceller according to the invention used in the case of multiple receptions.

The canceller that eliminates inter-symbol interference produced by these transmission channels is shown in FIG. 11. This figure should be compared with FIG. 4 (SISO case). The filter 100 is replaced by J filters $100^{(j)}$ with transfer function $H^{(j)}$(f), j ∈ [1, ..., J], each processing the sequence of samples $\tilde{d}_n$. The symbols output from filters $100^{(j)}$ denoted $\tilde{d}_n^{j'}$ where j ∈ [1, ..., J], are subtracted from the corresponding symbols $r_n^{(j)}$ by means of subtractor circuits $110^{(j)}$. The output from the subtractor circuits $110^{(j)}$ is then filtered by a filter $120^{(j)}$ with transfer function $P^{(j)}$(f). The symbols output by the J filters $p^{(j)}$(f), j ∈ [1, ..., J], are then added to each other by an adder circuit 125. Finally, the symbols obtained at the output from the adder circuit 125 are added to the complex symbols of the sequence $\{\tilde{d}_n\}_{n \in N}$ multiplied by the amplitude correction coefficient $g_0$ using the adder circuit 130, which outputs the sequence of complex symbols $\{\hat{d}_n\}_{n \in N}$.

This inter-symbol interference canceller has the same advantages as that shown in FIG. 4, namely it comprises small filters (small number of coefficients). The coefficients of the filters may be determined either using a transmission channel estimating circuit, or by a digital processing circuit using a tuning algorithm minimising a given optimisation criterion.

Like the device in FIG. 4, it may also be used in a turbo-equalisation device.

Although it is not described in detail, the said fractioned reception case is equivalent to the SIMO case. The said fractioned reception consists of picking up signals with a single reception antenna and then producing several sequences of samples at different times, the delay for each being equal to a fraction 1/m of the symbol period T, the sampling period of these sequences remaining equal to T. If m is an integer number, these sequences can then be processed as shown in FIG. 11.

In this description, we have expressed the transfer functions in the form of Fourier transforms (in f). They could be also expressed more generally and equivalently using a transform in z.

The invention claimed is:

1. A device for cancelling inter-symbol interference in a sequence of digital signal input samples ($\{r_n\}_{n \in N}$) originating from a transmission channel defined by its transfer function H(f) in the frequency domain, each sample being representative of a complex symbol, comprising:
   a first filter that converges towards a filter with a transfer function H(f), the first filter receives a sequence of samples ($\{\tilde{d}_n\}_{n \in N}$) as input representing the digital signal sent to the input of the transmission channel;
   a subtractor circuit to subtract the output ($\{d'_n\}_{n \in N}$) of the first filter from the sequence of input samples ($\{r_n\}_{n \in N}$);
   a second filter that converges towards a filter tuned to the transmission channel, the output ($\{e_n\}_{n \in N}$) from the subtractor circuit being input to this second filter; and
   an output circuit designed to combine the output from the second filter and the sequence of samples ($\{\tilde{d}_n\}_{n \in N}$) representative of the digital signal sent to the input of the transmission channel to generate a sequence of complex symbols ($\{\hat{d}_n\}_{n \in N}$) without the inter-symbol interferences generated by the transmission channel.

2. A device according to claim 1, wherein the output circuit is an adder circuit designed to add the output from the second filter to the sequence of samples ($\{\tilde{d}_n\}_{n \in N}$) representative of the digital signal sent to the input of the transmission channel.

3. A device according to claim 2, wherein an amplitude correction coefficient is applied to the samples ($\{\tilde{d}_m\}_{m \in N}$) of the sequence representative of the digital signal sent to the input of the transmission channel that are processed by the adder circuit.

4. A device according to claim 3, wherein in the case of a transmission channel disturbed by an additive noise with coefficients that vary with time, the amplitude correction coefficient depends on the estimated power of the transmission channel and the variance of the additive noise.

5. A device according to claim 4, wherein in the case of a transmission channel disturbed by an additive noise with variance $\sigma_w^2$ with coefficients $\Gamma_k(n)$ varying with time such that, at time n, $$\sum_{k=L_1+1}^{L_2} |\Gamma_k(n)|^2 = \alpha_n,$$

the amplitude correction coefficient assigned to the sequence of samples ($\{\tilde{d}_n\}_{n \in N}$) representative of the digital signal sent to the input of the transmission channel is equal to $$\frac{\alpha_n}{\sigma_w^2 + \alpha_n}$$

and the transfer function of the filter towards which the second filter converges is $$\frac{1}{\sigma_w^2 + \alpha_n}(|H(f)|^2 - \alpha_n).$$

6. A device according to claim 4, wherein in the case of a transmission channel disturbed by an additive noise with variance $\sigma_w^2$, the amplitude correction coefficient assigned to the sequence of samples ($\{\tilde{d}_n\}_{n \in N}$) representative of the digital signal sent to the input of the transmission channel with variance $\sigma_d^2$ is equal to $$g_0 = \frac{\beta \cdot \sigma_d^2}{1 + \beta \cdot E\{|\tilde{d}_n|^2\}} \text{ where } \beta = T \cdot \int_{-1/2T}^{1/2T} \frac{|H(f)|^2}{|H(f)|^2 \cdot (\sigma_d^2 - E\{|\tilde{d}_n|^2\}) + \sigma_w^2} df,$$

where T represents the sent symbols period, and the transfer function of the filter towards which the second filter converges is $$\frac{g_0}{\beta} \times \frac{H^*(f)}{|H(f)|^2 \cdot (\sigma_d^2 - E\{|\tilde{d}_n|^2\}) + \sigma_w^2}.$$

7. A device according to claim 1, the coefficients of the first and second filters being determined by a digital processing circuit using a tuning algorithm based on an optimization criterion designed to minimize the influence of inter-symbol interference at the output from the device.

8. A device according to claim 1, the coefficients of the first and second filters being determined by a transmission channel estimating circuit.

9. A device according to claim 1, the device being adapted for the reception of digital data sent through a radio channel.

10. A digital signals receiver, comprising a device for cancelling inter-symbol interference according to claim 1, including a dedicated circuit to generate the sequence of samples ($\{\tilde{d}_n\}_{n \in N}$) representative of the digital signal sent to the input of the transmission channel.

11. A receiver according to claim 10, the dedicated circuit being a transverse linear equalizer or a maximum probability equalizer to which the input sample sequence ($\{r_n\}_{n \in N}$) is input.

12. A turbo-equalization device comprising a plurality of turbo-equalization modules in series, each turbo-equalization module with a rank greater than 1 in the series of modules comprising a device for cancelling inter-symbol interference according to claim 1, the sequence of samples ($\{\tilde{d}_n\}_{n \in N}$) representative of the digital signal sent to the input of the transmission channel being output by the lower rank turbo-equalization module, for each interference canceller.

13. A device for cancelling inter-symbol interference in J sequences of input samples ($\{r_n^{(j)}\}_{n \in N}$) of a digital signal originating from J transmission channels defined by their transfer functions $H^{(j)}$(f) in the frequency domain, where J is an integer greater than or equal to 2, each sample being representative of a complex symbol, comprising:
   a first set of J filters, each of which converges towards a filter with transfer function $H^{(j)}$(f), j∈, each of the filters of the first set receiving a sequence of samples ($\{\tilde{d}_n\}_{n \in N}$) as in representative of the digital signal sent to the input of the transmission channels;
   a set of J subtractor circuits to subtract the outputs ($\{d_n^{(j)}\}_{n \in N}$) from the J filters in the first set from the corresponding J sequences of input samples ($\{r_n^{(j)}\}_{n \in N}$) respectively;

a second set of J filters that converge towards filters tuned to the J transmission channels, each filter in the second set receiving the output from one of the J subtractor circuits as input; and a first adder circuit to add the samples output by the J filters in the second set; and an output circuit designed to combine the output from the first adder circuit and the sequence of samples ($\{\tilde{d}_n\}_{n\in N}$) representative of the digital signal sent to the input of the transmission channels, to generate a sequence of complex symbols (($\hat{d}_n\}_{n\in N}$) from which the inter-symbol interference generated by the transmission channels has been eliminated.

14. A device according to claim 13, the output circuit being a second adder circuit designed to add the output from the first adder circuit to the sample sequence ($\{\tilde{d}_n\}_{n\in N}$) representative of the digital signal sent to the input of the transmission channels.

15. A device according to claim 14, wherein an amplitude correction coefficient is applied to the samples ($\{\tilde{d}_n\}_{n\in N}$) of the sequence representative of the digital signal sent to the input of the transmission channels that are processed by the second adder circuit.

16. A device according to claim 13, the coefficients of the filters in the first and second sets being determined by a digital processing circuit using a tuning algorithm based on an optimization criterion designed to minimize the influence of inter-symbol interference at the output from the device.

17. A device according to claim 13, the coefficients of the filters in the first and second sets being determined by a transmission channel estimating circuit.

18. A digital signals receiver comprising a device for cancelling inter-symbol interference according to claim 13, and a dedicated circuit to generate the sequence of samples ($\{\tilde{d}_n\}_{n\in N}$) representative of the digital signal sent to the input of the transmission channels.

19. A receiver according to claim 18, the dedicated circuit being a transverse linear equalizer or a maximum probability equalizer to which the input sample sequences J ($\{r_n^{(j)}\}_{n\in N}$) are input.

20. A turbo-equalization device comprising a plurality turbo-equalization modules in series, each turbo-equalization module with a rank greater than 1 in the series of modules comprising a device for cancelling inter-symbol interference according to claim 13, the sequence of samples ($\{\tilde{d}_n\}_{n\in N}$) representative of the digital signal sent to the input of the transmission channel being output by the lower rank turbo-equalization module, for each interference cancelling device.

* * * * *